F. F. Smith,
Making Plow Plates,
No. 1,706, Reissued June 21. 1864.
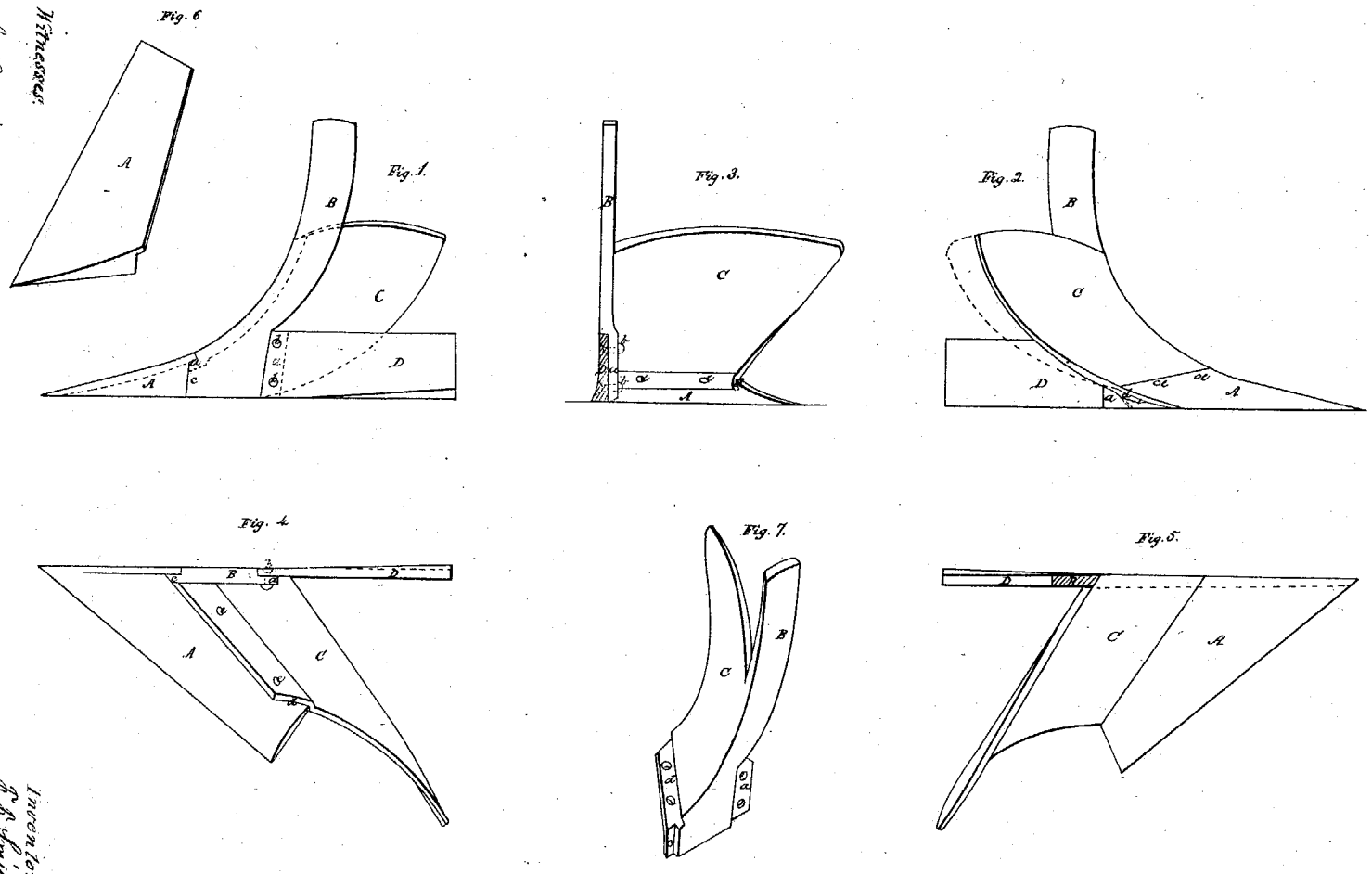
Witnesses.
J. W. Conuly
R. S. Spencer
Inventor.
F. F. Smith
per Munn & Co.
Attorneys.

UNITED STATES PATENT OFFICE.

F. F. SMITH, OF COLLINSVILLE, CONNECTICUT, ASSIGNOR TO HIMSELF AND THE COLLINS COMPANY, OF SAME PLACE.

IMPROVEMENT IN PLOWS.

Specification forming part of Letters Patent No. 30,691, dated November 20, 1860; Reissue No. 1,706, dated June 21, 1864.

DIVISION B.

*To all whom it may concern:*

Be it known that I, F. F. SMITH, formerly of Momence, in the county of Kankakee and State of Illinois, but now of Collinsville, in the county of Hartford and State of Connecticut, have invented a new and useful Improvement in Cast Cast-Steel Plows; and I do hereby declare that the following is a full, clear, and exact description of the same, together with the manner of casting the plates thereof, reference being had to the accompanying drawings, forming a part of this specification, in which—

Figures 1 and 2 represent opposite side views of a plow made of cast cast-steel as to share, mold-board, and landside. Fig. 3 represents a rear view of the same. Fig. 4 represents a view of the bottom of the plow. Fig. 5 represents a top view of the same. Fig. 6 represents a perspective view of the share separate from the other parts, and Fig. 7 represents a perspective view of the casting constituting the mold-board and standard.

Heretofore steel-plows have been made of plate or rolled steel, worked into shape by bending, welding, and other forging operations, and, owing to the difficulties which present themselves in this mode of manufacturing them, have had many serious defects, among which is that of making the different parts of nearly uniform thickness, while the wear is much greater upon some portions of the plow than upon other portions, and thus some portions may be worn out before other portions are scarcely polished bright by use. Another defect in this plan arises from the difficulty of fashioning the parts to the exact shape desired, inasmuch as they are shaped by hand or by the eye only. No system of dies has been found suitable for shaping these steel plow-plates that I know of.

My invention consists in the production of a plow (or of those parts of a plow commonly made of steel, viz., the share, the landside, and the mold-board) made of cast cast-steel and of irregular form, and of variable thickness, if desired.

The accompanying drawings represent a cast cast-steel plow, the share A of which is of one casting, its mold-board B and standard C of another casting, and its landside D of a third piece of casting. For the purpose of uniting these pieces to form a plow, the casting B C is made with a flange, *a*, at the foot and back of the standard for the attachment of the landside D by rivets or bolts *b b*, countersunk on the outside of the landside, said flange being thrown back under the mold-board, as shown in Figs. 3 and 4, to enable the landside to be brought flush with the standard and corresponding edge of the share. Said casting B C may also be made with a flange, *c*, of similar character to that of *a* in front of the standard, and a rabbet, *d*, Figs. 2, 3, and 4, formed along its front or lower edge, that the back or upper edge of the share may lap over it in such manner that the faces of the mold-board and share may come together with a flush joint. The share is secured by rivets or bolts *e e*, passing through the rabbet *d* and countersunk on the outside. Each casting is made by pouring molten steel from a crucible or other vessel into a mold whose cavity is of the desired form. The contour of the mold gives the form to the plow-plate, and this form may be varied to suit the fashion of the plows to be made or the particular parts thereof that are to be made of steel.

Having thus fully described my invention, what I claim therein as new, and desire to secure by Letters Patent, is—

A plow the plates of which are made of molten cast-steel, substantially as and for the purpose described.

F. F. SMITH.

Witnesses:
A. B. STOUGHTON,
EDM. F. BROWN.